United States Patent
Merx et al.

(10) Patent No.: US 11,360,977 B2
(45) Date of Patent: Jun. 14, 2022

(54) SELECTIVELY ALLOWING QUERY OPTIMIZATION IN QUERY PROCESSING

(71) Applicant: SAP SE, Walldorf (DE)

(72) Inventors: Johannes Merx, Heidelberg (DE); Taehyung Lee, Seoul (KR); Sung Heun Wi, Gyeonggi (KR); Jin Uk Bae, Seoul (KR); Ki Hong Kim, Seoul (KR); Stefan Baeuerle, Rauenberg (DE); Florian Scheid, Wiesloch (DE)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 16/371,276

(22) Filed: Apr. 1, 2019

(65) Prior Publication Data

US 2020/0311081 A1 Oct. 1, 2020

(51) Int. Cl.
*G06F 16/00* (2019.01)
*G06F 16/2453* (2019.01)

(52) U.S. Cl.
CPC .. *G06F 16/24542* (2019.01); *G06F 16/24537* (2019.01)

(58) Field of Classification Search
CPC .................... G06F 16/24542; G06F 16/24537
USPC ....................................................... 707/718
See application file for complete search history.

(56) References Cited

U.S. PATENT DOCUMENTS

| | | | |
|---|---|---|---|
| 7,065,537 B2 | 6/2006 | Cha et al. | |
| 7,565,443 B2 | 7/2009 | Rossmanith et al. | |
| 7,647,251 B2 | 1/2010 | Baeuerle et al. | |
| 7,788,319 B2 | 8/2010 | Schmidt et al. | |
| 7,844,659 B2 | 11/2010 | Baeuerle et al. | |
| 7,930,274 B2 | 4/2011 | Hwang et al. | |
| 7,934,219 B2 | 4/2011 | Baeuerle et al. | |
| 8,108,433 B2 | 1/2012 | Baeuerle et al. | |
| 8,356,056 B2 | 1/2013 | Schlarb et al. | |
| 8,392,573 B2 | 3/2013 | Lehr et al. | |
| 8,413,150 B2 | 4/2013 | Lu et al. | |
| 8,484,167 B2 | 7/2013 | Glania et al. | |
| 8,504,980 B1 | 8/2013 | Kraft et al. | |
| 8,683,436 B2 | 3/2014 | Baeuerle et al. | |
| 8,719,826 B2 | 5/2014 | Baeuerle et al. | |
| 8,751,437 B2 | 6/2014 | Teichmann et al. | |

(Continued)

FOREIGN PATENT DOCUMENTS

CN 108021981 A * 5/2018

OTHER PUBLICATIONS

U.S. Appl. No. 11/097,107, Schmidt et al., filed Mar. 31, 2005.

*Primary Examiner* — Irete F Ehichioya
*Assistant Examiner* — Shirley D Hicks
(74) *Attorney, Agent, or Firm* — Fish & Richardson P.C.

(57) ABSTRACT

Implementations of the present disclosure include receiving, by a query processing server, a first query, the first query including a syntax indicating that precision loss is allowed, processing, by the query processing server, the first query to provide a first QEP, optimization of which would result in precision loss in a generated query result, determining that the syntax is provided, and in response, optimizing the first QEP to provide an optimized QEP, executing the optimized QEP to generate a query result that includes data stored within a database system, the query result having reduced accuracy relative to a query result that would be generated based on the first QEP, and providing the query result as output from the database system.

20 Claims, 4 Drawing Sheets

(56) References Cited

U.S. PATENT DOCUMENTS

| | | |
|---|---|---|
| 8,856,727 B2 | 10/2014 | Schlarb et al. |
| 8,892,667 B2 | 11/2014 | Brunswig et al. |
| 8,938,645 B2 | 1/2015 | Schlarb et al. |
| 9,037,570 B2 | 5/2015 | Weyerhaeuser et al. |
| 9,038,021 B2 | 5/2015 | Schlarb et al. |
| 9,116,953 B2 | 8/2015 | Weyerhaeuser et al. |
| 9,116,960 B2 | 8/2015 | Weyerhaeuser et al. |
| 9,146,979 B2 | 9/2015 | Weyerhaeuser et al. |
| 9,176,801 B2 | 11/2015 | Baeuerle et al. |
| 9,182,994 B2 | 11/2015 | Schlarb et al. |
| 9,213,737 B2 | 12/2015 | Weyerhaeuser et al. |
| 9,213,739 B2 | 12/2015 | Mindnich et al. |
| 9,361,340 B2 | 6/2016 | Jeong et al. |
| 9,507,810 B2 | 11/2016 | Baeuerle et al. |
| 9,613,094 B2 | 4/2017 | Mindnich et al. |
| 9,619,514 B2 | 4/2017 | Mindnich et al. |
| 9,715,527 B2 | 7/2017 | Mindnich et al. |
| 9,747,335 B2 | 8/2017 | Lee et al. |
| 9,753,981 B2 | 9/2017 | Weyerhaeuser et al. |
| 9,767,151 B2 | 9/2017 | Mindnich et al. |
| 9,846,724 B2 | 12/2017 | Weyerhaeuser et al. |
| 9,892,163 B2 | 2/2018 | Kim et al. |
| 9,916,374 B2 | 3/2018 | Weyerhaeuser et al. |
| 10,061,808 B2 | 8/2018 | Kim et al. |
| 10,067,980 B2 | 9/2018 | Weyerhaeuser et al. |
| 10,114,626 B2 | 10/2018 | Bregler et al. |
| 10,114,825 B2 | 10/2018 | Weyerhaeuser et al. |
| 10,133,778 B2 | 11/2018 | Lee et al. |
| 10,140,335 B2 | 11/2018 | Weyerhaeuser et al. |
| 10,169,410 B2 | 1/2019 | Merx et al. |
| 10,185,744 B2 | 1/2019 | Bensberg et al. |
| 10,198,475 B2 | 2/2019 | Mindnich et al. |
| 10,496,644 B2 * | 12/2019 | Chamieh ............... G06F 16/284 |
| 2004/0117435 A1 | 6/2004 | Rossmanith et al. |
| 2004/0254945 A1 | 12/2004 | Schmidt et al. |
| 2008/0033989 A1 | 2/2008 | Cha et al. |
| 2008/0114626 A1 | 5/2008 | Baeuerle et al. |
| 2008/0126409 A1 | 5/2008 | Weber et al. |
| 2009/0018989 A1 * | 1/2009 | Chang ................... G06F 16/242 |
| 2010/0094882 A1 * | 4/2010 | Lee ..................... G06F 16/2471 |
| | | 707/755 |
| 2010/0162147 A1 | 6/2010 | Ritter et al. |
| 2011/0145255 A1 | 6/2011 | Kim et al. |
| 2012/0158556 A1 | 6/2012 | Said et al. |
| 2013/0046894 A1 | 2/2013 | Said et al. |
| 2014/0095475 A1 * | 4/2014 | Su ..................... G06F 16/24542 |
| | | 707/718 |
| 2015/0006730 A1 | 1/2015 | Helfman et al. |
| 2016/0063378 A1 | 3/2016 | Park et al. |
| 2016/0140174 A1 | 5/2016 | Weyerhaeuser et al. |
| 2016/0140241 A1 | 5/2016 | Weyerhaeuser et al. |
| 2016/0217210 A1 | 7/2016 | Weyerhaeuser et al. |
| 2016/0342646 A1 * | 11/2016 | Baranczyk ........ G06F 16/24524 |
| 2016/0350368 A1 | 12/2016 | Weyerhaeuser et al. |
| 2016/0350374 A1 | 12/2016 | Weyerhaeuser et al. |
| 2017/0139982 A1 | 5/2017 | Weyerhaeuser et al. |
| 2017/0139989 A1 | 5/2017 | Weyerhaeuser et al. |
| 2017/0147636 A1 | 5/2017 | Weyerhaeuser et al. |
| 2017/0147637 A1 | 5/2017 | Mindnich et al. |
| 2017/0147639 A1 | 5/2017 | Lee et al. |
| 2017/0147645 A1 | 5/2017 | Song et al. |
| 2017/0147646 A1 | 5/2017 | Lee et al. |
| 2017/0147671 A1 | 5/2017 | Bensberg et al. |
| 2017/0322952 A1 | 11/2017 | Schwing et al. |
| 2017/0322972 A1 | 11/2017 | Lee et al. |
| 2017/0322988 A1 | 11/2017 | Weyerhaeuser et al. |
| 2017/0323001 A1 | 11/2017 | Schwing et al. |
| 2017/0357576 A1 | 12/2017 | Lee et al. |
| 2018/0018368 A1 | 1/2018 | Baeuerle et al. |
| 2018/0137011 A1 | 5/2018 | Schwing et al. |
| 2018/0196833 A1 | 7/2018 | Corradi et al. |
| 2018/0210921 A1 | 7/2018 | Von Haaren et al. |
| 2018/0253473 A1 | 9/2018 | Ziegler et al. |
| 2018/0293276 A1 | 10/2018 | Bae et al. |
| 2018/0336245 A1 | 11/2018 | Wu et al. |
| 2018/0357279 A1 * | 12/2018 | Park ................... G06F 16/24542 |
| 2019/0018876 A1 | 1/2019 | Schwing et al. |

* cited by examiner

SELECTIVELY ALLOWING QUERY OPTIMIZATION IN QUERY PROCESSING

BACKGROUND

Database systems store data that can be queried. For example, a query can be submitted to a database system, which processes the query and provides a query result. Queries are written in a query language. An example query language includes, without limitation, the structured query language (SQL), which can be described as a standard database language that is used to create, maintain and retrieve data stored in a relational database (e.g., a database, in which data is stored in relational tables).

Processing of the query includes creating a query execution plan (QEP) that is executed by an execution engine to provide a query result. In some examples, an optimizer determines the QEP that is to be executed based on one or more costs. Example costs can include, time, processing, and/or memory to execute the QEP and provide the query result. Accordingly, the optimizer selects the QEP that minimizes one or more costs, as an optimized QEP. However, in some instances, the optimized QEP can result in reduced precision in the query result. In such instances, the optimizer is not used, and a non-optimized QEP is executed to provide a more precise query result than an optimized QEP would provide, but at a greater cost.

SUMMARY

Implementations of the present disclosure include computer-implemented methods for executing queries in database systems. More particularly, implementations of the present disclosure are directed to selectively enabling optimization of query execution plans (QEPs).

In some implementations, actions include receiving, by a query processing server, a first query, the first query including a syntax indicating that precision loss is allowed, processing, by the query processing server, the first query to provide a first QEP, optimization of which would result in precision loss in a generated query result, determining that the syntax is provided, and in response, optimizing the first QEP to provide an optimized QEP, executing the optimized QEP to generate a query result that includes data stored within a database system, the query result having reduced accuracy relative to a query result that would be generated based on the first QEP, and providing the query result as output from the database system. Other implementations include corresponding systems, apparatus, and computer programs, configured to perform the actions of the methods, encoded on computer storage devices.

These and other implementations may each optionally include one or more of the following features: determining that the syntax is provided includes determining that a node of the first QEP includes a parameter that indicates that precision loss is allowed; the parameter is associated with the node by a parser that parses the first query to provide the first QEP; optimizing the first QEP includes applying at least one rewriting of a set of rewritings to the node, the optimized QEP including the at least one rewriting, the at least one rewriting reducing an accuracy of the query result; the set of rewritings includes round, floor, ceiling, and aggregation reordering; actions further include: receiving, by the query processing server, a second query, the second query being absent the syntax, processing, by the query processing server, the second query to provide a second QEP, optimization of which would result in precision loss in a generated query result, and determining that the syntax is absent from the second query, and in response, executing the second QEP to generate a second query result; and the query processing server includes a structured query language (SQL) server.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to processing queries in database systems. More particularly, implementations of the present disclosure are directed to selectively enabling optimization of query execution plans (QEPs). In some implementations, actions include receiving, by a query processing server, a first query, the first query including a syntax indicating that precision loss is allowed, processing, by the query processing server, the first query to provide a first QEP, optimization of which would result in precision loss in a generated query result, determining that the syntax is provided, and in response, optimizing the first QEP to provide an optimized QEP, executing the optimized QEP to generate a query result that includes data stored within a database system, the query result having reduced accuracy relative to a query result that would be generated based on the first QEP, and providing the query result as output from the database system.

Implementations of the present disclosure are described in further detail with reference to an example query language. The example query language includes the structured query language (SQL) as the language that is used to query the database system. It is contemplated, however, that implementations of the present disclosure can be realized with any appropriate query language.

Figure 1:
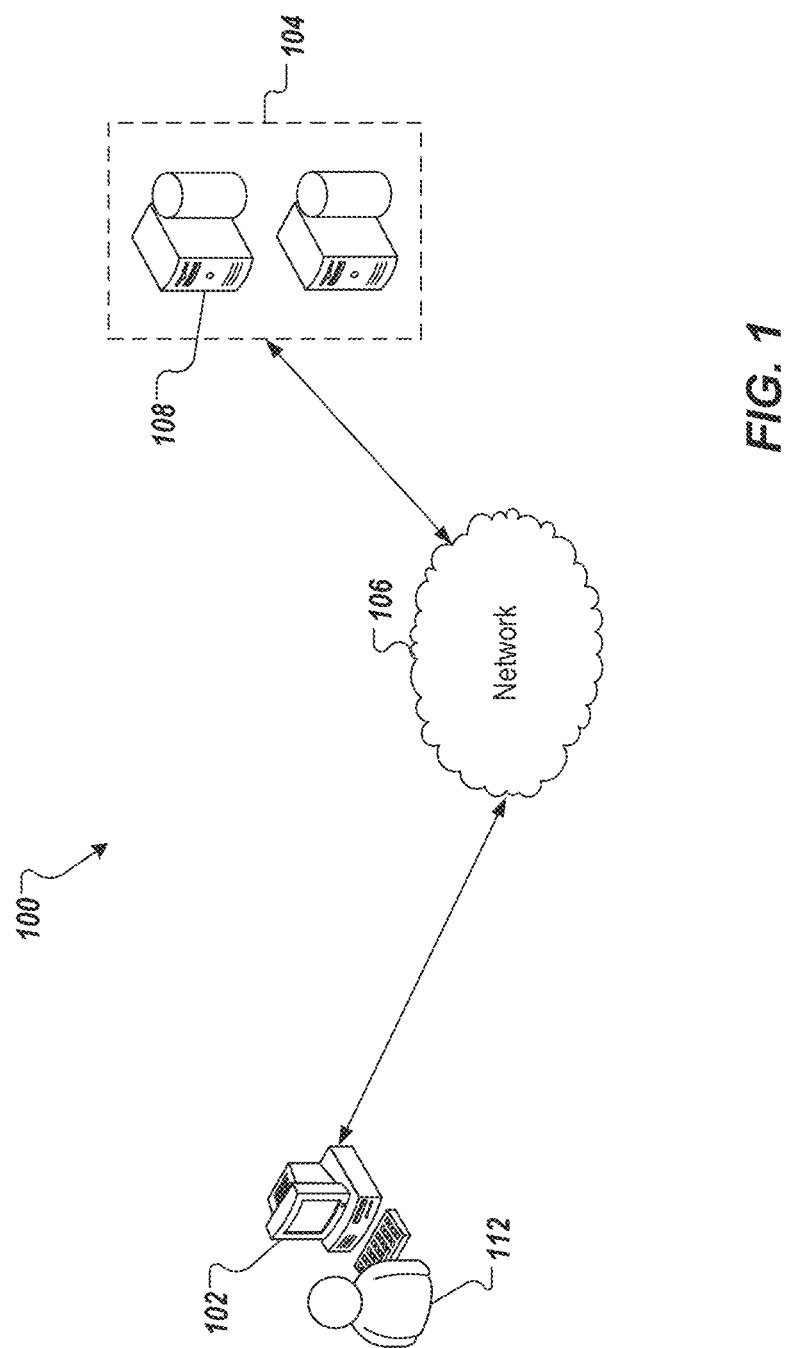
FIG. 1 depicts an example environment that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host a database system. For example, the server system 104 can host an in-memory database system. An example in-memory database system includes SAP HANA provided by SAP SE of Walldorf, Germany. In general, an in-memory database system uses main memory for data storage. Main memory may include one or more types of memory (e.g., DRAM, NVM) that communicates with one or more processors (e.g., CPU(s)) over a memory bus. An in-memory database system may be contrasted with database management systems that employ a disk storage mechanism. In some examples, in-memory database systems may be faster than disk storage databases, because internal optimization algorithms may be simpler and execute fewer instructions. In some examples, accessing data in an in-memory database system may reduce or eliminate seek time when querying the data, providing faster and more predictable performance than disk-storage databases. As described herein, the database system can receive a query (e.g., from a client-side application) and can process the query to provide a query result.

Figure 2:
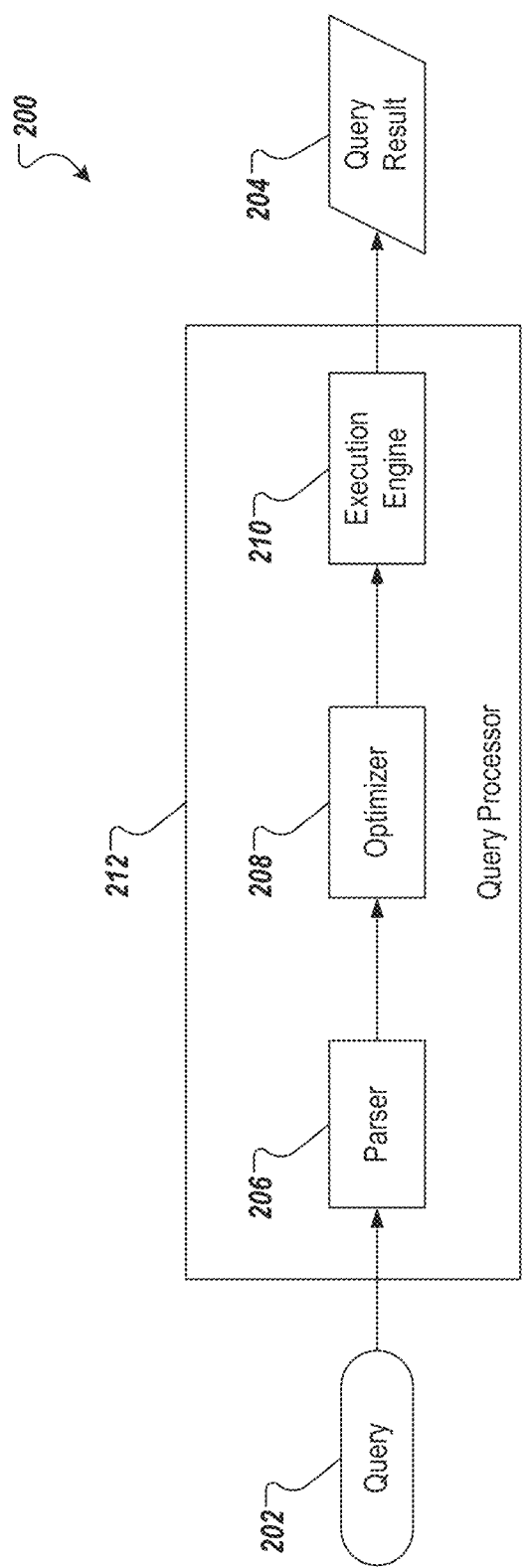
FIG. 2 depicts an example query processing flow in accordance with implementations of the present disclosure.

FIG. 2 depicts an example query processing flow 200 in accordance with implementations of the present disclosure. In the example of FIG. 2, a query 202 is processed to provide a query result 204 that is based on data stored within a database system. In the depicted example, a parser 206, an optimizer 208, and an execution engine 210 are provided. In some examples, the parser 206, the optimizer 208, and the execution engine 210 can each be provided within a query processor 212. In general, and as described in further detail herein, the query processor 212 receives the query 202, determines a QEP for executing the query within the database system, executes the QEP, and provides the query result 204. In accordance with implementations of the present disclosure, the QEP can be an optimized QEP, or a non-optimized QEP.

In further detail, the query 202 is submitted to be processed by the query processor 212. For example, the query 202 is submitted to a SQL server and is written in SQL, described herein. Because SQL is a declarative query language, the query 202 defines what data is to be retrieved from the database system (e.g., as opposed to an imperative language that describes steps to be performed to retrieve the data). In view of this, the query processor 212 determines a QEP that is to be executed. In some examples, the QEP is determined to be the most-efficient QEP (e.g., in terms of one or more of the above-introduced costs) for providing the query result 204, while providing reduced accuracy of the query result 204. In some examples, the QEP is determined to be not the most-efficient QEP (e.g., in terms of one or more of the above-introduced costs) for providing the query result 204, while providing improved accuracy of the query result 204.

In some implementations, the parser 206 processes the query 202 to provide a parse tree. In some examples, the parser 206 performs parsing and binding to provide the parse tree. In some examples, the parse tree can be described as a logical tree having multiple nodes, each node representing a logical operation that is to be performed to provide the query result 204. Example operations include, without limitation, reading data from a specified table, and performing an inner/outer join. In further detail, parsing includes ensuring that the query 202 has a valid syntax and translating the query 202 into the parse tree.

Initially, the logical operators of the parse tree are closely related to the original syntax of the query (e.g., "get data from the REGION table," "get data from the FACTS table," "perform an OUTER JOIN). Different tree representations of the query are generated during optimization, and operators of the various logical trees may receive different names. Binding generally refers to name resolution, during which it is ensured that all of the object names provided in the query 202 exist in the database system, and each table name and column name in the parse tree is associated with a respective database object. The output of binding is referred to as an algebraized tree, which is output as the parse tree by the parser 206. The parse tree output by the parser 206 can be considered a non-optimized QEP.

In some implementations, and as described in further detail herein, it can be determined that optimization of the QEP would result in reduced accuracy of the query result 204. Consequently, the QEP output from the parser 206 can be passed to the execution engine 210 for execution. However, and in accordance with implementations of the present disclosure, it can be determined that, although optimization of the QEP would result in reduced accuracy of the query result 204, the query 202 indicates that the QEP is to be anyway optimized. That is, and as described in further detail herein, the query 202 can force optimization of at least a portion of a QEP that would not be otherwise optimized.

In some implementations, the optimizer 208 generates a set of QEPs based on the QEP received from the parser 206. Each QEP in the set of QEPs represents a respective set of operations that can be performed to execute the query 202. In some examples, the set of QEPs includes the QEP provided by the parser 206. Each QEP can be considered a set of physical operations (e.g., index seek, nested loop join) that can be performed within the database system to produce the query result 204. In some examples, for each QEP in the set of QEPs, the optimizer 208 determines one or more costs (e.g., resource cost, time cost). The optimizer 208 selects the QEP having the lowest cost as the optimized QEP, which is provided to the execution engine 210.

As introduced above, implementations of the present disclosure are directed to selectively forcing QEP optimization even if the optimized QEP would result in reduced accuracy of the query result. To provide further context for implementations of the present disclosure, and as introduced above, applications execute on database systems to provide functionality including, for example, data analytics. In some examples, applications interact with the database system through queries. Data within the database system can be stored as data objects with data populating tables, and applications can interact with the database system through pre-defined views, table functions and tables, for example. In database systems, a view can define a result set of a stored query on data stored within the database system. A view can be described as a pre-established query command that is stored in the database system. Application objects can provide semantics and base functionalities by describing data models and providing calculation definitions. In some database systems, clients (e.g., applications interacting with the database system) can dynamically select, filter and aggregate columns of the views based on end-user interaction, for example.

In some examples, database objects delivered with the database system can provide a consistent and datatype harmonized semantical layer on top of base data and customer-provided data. Accordingly, semantical layers can include functionality for type harmonization and use type conversion and rounding functions. For example, SQL functions like ROUND, FLOOR, CEILING or decimal type casts may frequently be used by those objects. However, utilizing aggregation functions and filtering together with rounding or type conversion can easily become performance critical in production systems. This performance issue is enhanced with relatively large data sizes. Performance can be in terms of time to process queries, precision of query results, and/or technical resources (e.g., processors, memory) expended.

Due to a possible precision loss, execution of a query optimizer (e.g., the optimizer 208 of FIG. 2) is, traditionally, strictly disallowed to apply certain types of query rewritings (e.g., if rounding or type conversions are used). In such cases, some transformations (e.g., aggregation reordering/pushdown) are restricted. This can have a significant impact on query performance and memory consumption during execution of QEPs in production systems.

To highlight this, the following example code can be considered:

```
CREATE TABLE REGION (ID INT PRIMARY KEY, REGION VARCHAR(10), COUNRTY VARCHAR(20));
INSERT INTO REGION VALUES      (1, 'AMER', 'US');
INSERT INTO REGION VALUES      (2, 'AMER', 'Canada');
INSERT INTO REGION VALUES      (3, 'EMEA', 'Germany');
INSERT INTO REGION VALUES      (4, 'EMEA', 'France');
INSERT INTO REGION VALUES      (5, 'APJ', 'South Korea');
INSERT INTO REGION VALUES      (6, 'APJ', 'Japan');
CREATE TABLE FACTS (KEYFIGURE FLOAT, REGION_ID INT);
INSERT INTO FACTS VALUES       (133435.002111805, 1);
INSERT INTO FACTS VALUES       (1459223.31433322222, 1);
```

-continued

```
INSERT INTO FACTS VALUES       (15376.033423439, 2);
INSERT INTO FACTS VALUES       (222356.34233431, 3);
INSERT INTO FACTS VALUES       (242354.13433342, 4);
INSERT INTO FACTS VALUES       (182354.123444, 5);
INSERT INTO FACTS VALUES       (432376.34210331, 2);
CREATE OR REPLACE VIEW KEYFIGURES_PER_REGION AS
(
SELECT ROUND(KEYFIGURE, 3) AS KEYFIGURE, REGION, COUNRTY
  FROM (
  SELECT KEYFIGURE, REGION, COUNRTY FROM FACTS
LEFT OUTER JOIN REGION ON REGION_ID = ID
  )
);
```

In the example code, a table REGION and a table FACTS are created, and a view (KEYFIGURES_PER_REGION) is defined, which provides the calculation definition of different key figures together with additional functionalities, which can be queried by clients depending on the user interaction. To display consistent datatypes and precision, the view additionally includes type casting and rounding functions. A query (e.g., SELECT * FROM KEYFIGURES_PER_REGION) can be submitted to display all calculated key figure values per country and region. For example:

TABLE 1

| Example Query Result | | | |
|---|---|---|---|
| | KEYFIGURE | REGION | COUNTRY |
| 1 | 135,435,002 | AMER | US |
| 2 | 1,459,223,314 | AMER | US |
| 3 | 15,376,033 | AMER | Canada |
| 4 | 222,356,342 | EMEA | Germany |
| 5 | 242,354,1234 | EMEA | France |
| 6 | 182,354,123 | APJ | South Korea |
| 7 | 432,376,342 | AMER | Canada |

In some examples, a query (e.g., SELECT SUM (KEYFIGURE), REGION FROM KEYFIGURES_PER_REGION GROUP BY REGION) can be submitted to aggregate the key figures and group the result by all existing regions. For example:

TABLE 2

| Example Query Result (Aggregation) | | |
|---|---|---|
| | SUM(KEYFIGURE) | REGION |
| 1 | 2,040,410,691 | AMER |
| 2 | 464,710,476 | EMEA |
| 3 | 182,354,123 | APJ |

A declarative query plan typically enables different subsets of relational transformations (e.g., QEP alternatives), which provide the same query result. However, the cost in terms of execution time, CPU time and memory consumption may significantly differ among the QEP alternatives. Accordingly, a task of the optimizer is to consider and estimate different plan variants and to choose a QEP with minimal cost. Continuing with the examples above, an optimizer might, for example, enumerate an alternative QEP by reordering the aggregation and pre-aggregating the input data of the join. Pre-aggregating of join inputs often provides better performance for the given data distribution. The example optimized query can be provided:

```
SELECT ROUND( SUM(KEYFIGURE), 3) AS PROFITABILITY,
REGION
FROM (
SELECT SUM(KEYFIGURE) AS KEYFIGURE, REGION
FROM (SELECT SUM(KEYFIGURE) AS KEYFIGURE, REGION_ID
FROM FACTS GROUP BY REGION_ID)
LEFT OUTER JOIN (SELECT DISTINCT * FROM REGION)
ON REGION_ID = ID
GROUP BY REGION ) GROUP BY REGION;
```

Execution of this QEP can provide the following query result:

TABLE 3

Example Query Result (Optimized QEP)

|   | PROFITABILITY | REGION |
|---|---|---|
| 1 | 2,040,410,692 | AMER |
| 2 | 464,710,477 | EMEA |
| 3 | 182,354,123 | APJ |

However, and comparing the example query results provided in Table 2 to the query results provided in Table, the optimized QEP results in reduced precision of the result values. More particularly, because of the rounding, it is not possible to apply the reordering and pre-aggregation without precision loss of the result values. Traditionally, the optimizer is strictly not allowed to rewrite the QEP if the optimized QEP would result in reduced precision of the query results. More generally, rounding and casting functions (e.g., ROUND, FLOOR, CEILING) and type casting are problematic for query optimization, because they block many relational transformations. Consequently, in such instances, the query optimization potential of submitted queries can be significantly restricted. This highlights a tension, because such rounding and cast functions are an important base functionality of views provided with database systems, while they limit the optimization potential for the optimizer by reducing the number of possible plan transformations.

In view of this, and as introduced above, implementations of the present disclosure enable queries that explicitly ignore a potential precision loss through optimization and benefit from better performance and less memory consumption in query processing. More particularly, implementations of the present disclosure enable annotations to queries to indicate that precision loss is allowed. In response, an optimizer (e.g., the optimizer 208 of FIG. 2) may apply query rewritings to achieve QEPs with improved query performance. To achieve this, implementations of the present disclosure provide a syntax extension to decorate a query indicating that optimization is allowed. In some examples, the syntax is provided as:

ALLOW_PRECISION_LOSS(<expression>)

In some examples, and as described herein, the syntax of the present disclosure can be used by users and clients to control the optimization behavior and enable the optimizer freedom during query optimization. Giving this information to the optimizer may ignore a potential precision loss and apply query rewritings to achieve better query performance.

In some implementations, the syntax of the present disclosure signals that the optimizer can reorder expressions, for example, as part of optimization. In some examples, expressions that can be reordered can include SUM aggregation and inner expressions. In this manner, additional rewritings (e.g., aggregation pushdowns) can be included in an optimized QEP.

In further detail, the parser (e.g., the parser 206 of FIG. 2) is programmed to recognize the syntax (ALLOW_PRECISION_LOSS (<expression>)) within received queries. In some implementations, and in response to inclusion of the syntax within a query, the parser sets a parameter in respective nodes of the parse tree. In some examples, the parameter indicates that a logical operation (e.g., aggregation) of the respective node can be optimized, even though this would result in a reduced precision of the eventual query result. The optimizer (e.g., the optimizer 208 of FIG. 2) receives the parse tree and is programmed to recognize instances, in which the parameter is set in one or more nodes. In response to the parameter, the optimizer includes rewritings during QEP optimization that would otherwise not have been included, absent the syntax. Example rewritings include, without limitation, rounding and aggregation reordering.

The following provides an example in accordance with implementations of the present disclosure:

```
SELECT ALLOW_PRECISION_LOSS (SUM( CAST( ROUND(Keyfigure,
2) AS DECIMAL(15,2) )) )
FROM ...
-->
SELECT CAST( ROUND(SUM(Keyfigure), 2) AS DECIMAL(15,2) )
FROM ...
```

Referring again to the examples above, using the syntax ALLOW_PRECISION_LOSS of the present disclosure may result in the same plan and same result set (Table 3) as provided above. For example, the following example query can be provided:

```
SELECT ALLOW_PRECISION_LOSS(SUM(KEYFIGURE)), REGION
from KEYFIGURES_PER_REGION GROUP BY REGION;
```

Accordingly, implementations of the present disclosure enable improved (e.g., sped up, reduced resource consumption) query processing in application views. In some examples, such improvements can be selectively implemented in scenarios where precision loss is acceptable. As described herein, users can dynamically choose whether precision loss is allowed in order to benefit from a better performance and less memory consumption of their queries. In this manner, the availability to ignore precision loss gives the optimizer significantly more freedom during query optimization and the possibility to support completely new types of query rewritings.

Figure 3:
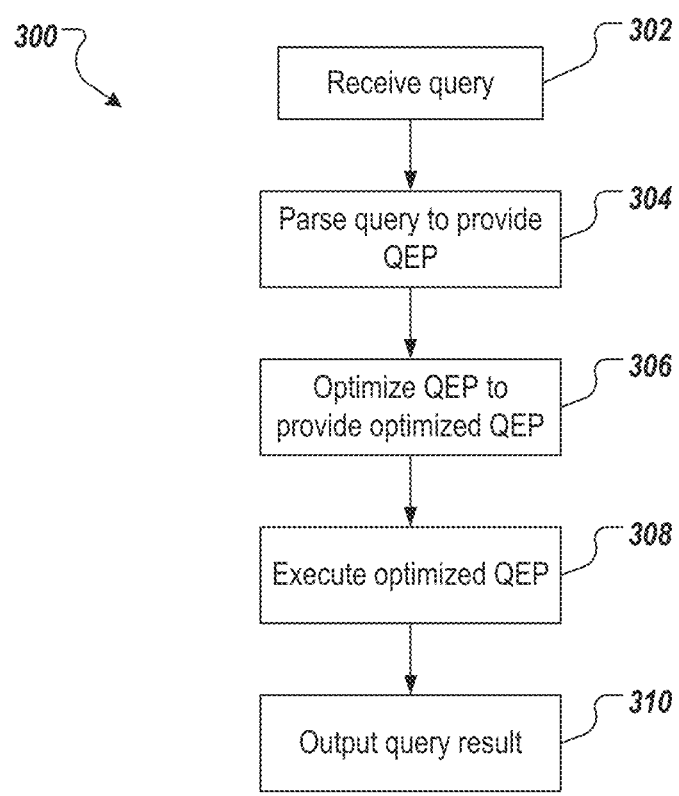
FIG. 3 depicts an example process that can be executed in accordance with implementations of the present disclosure.

FIG. 3 depicts an example process 300 that can be executed in accordance with implementations of the present disclosure. In some implementations, the example process 300 may be performed using one or more computer-executable programs executed using one or more computing devices. The example process 300 can be performed for processing queries to provide query results from database systems.

A query is received (302). For example, a query processing server (e.g., SQL server) receives the query. In some examples, the query includes a syntax indicating that precision loss is allowed. The query is parsed to provide a QEP (304). For example, a parser parses the query to provide a QEP as a parse tree. In some examples, optimization of the QEP would result in precision loss in a generated query result. For example, optimization would result in functions that, if executed, would result in reduced accuracy of the generated query result. The QEP is optimized to provide an optimized QEP (306). For example, it can be determined that the syntax had been provided in the query, and in response, the QEP is optimized to provide the optimized QEP. In some examples, determining that the syntax had been provided includes determining that a node of the QEP includes a parameter that indicates that precision loss is allowed. In some examples, the parameter is associated with the node by the parser. In some examples, optimizing the QEP includes applying at least one rewriting of a set of rewritings to the node, the optimized QEP including the at least one rewriting, the at least one rewriting reducing an accuracy of the query result. In some examples, the set of rewritings includes round, floor, ceiling, and aggregation reordering. The optimized QEP is executed (308). For example, the optimized QEP is executed to generate a query result that includes data stored within a database system. In some examples, the query result has reduced accuracy relative to a query result that would be generated based on the QEP had it not been optimized. The query result is output from the database system (310).

Figure 4:
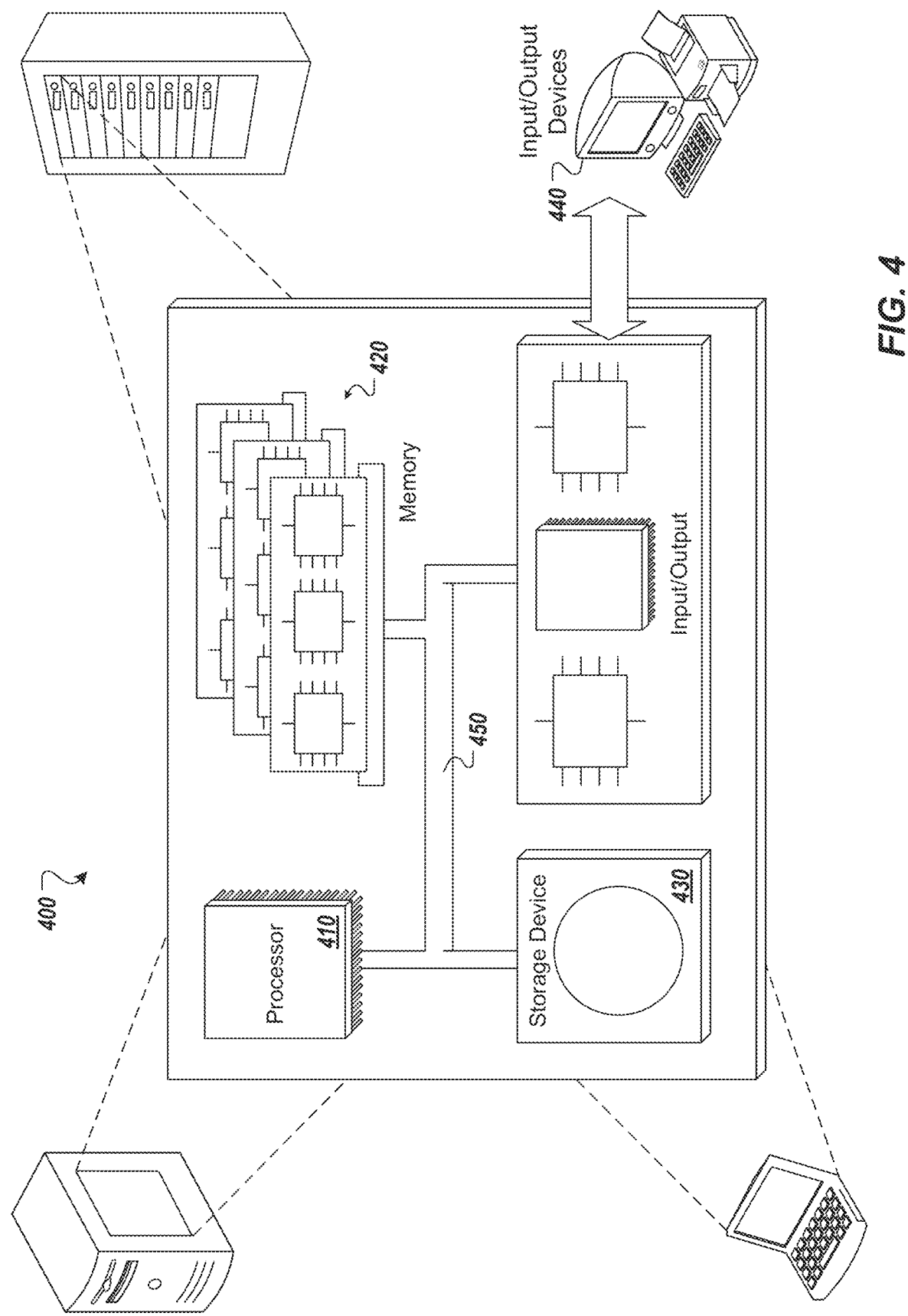
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for processing queries to provide query results from database systems, the method comprising:
   receiving, by a query processing server, a first query, the first query comprising a syntax indicating that precision loss is allowed;
   processing, by the query processing server, the first query to provide a first query execution plan (QEP);
   in response to determining that the syntax indicating precision loss is allowed, associating, by a parser of the query processing server, a parameter with a node of the first QEP, including setting the parameter indicating that precision loss is allowed;
   determining that the syntax is provided, and in response, optimizing the first QEP to provide an optimized QEP by:
      generating a set of optimized QEP candidates based on the first QEP using rewritings that would not have been included absent the parameter indicating that precision loss is allowed, and
      selecting an optimized QEP candidate as the optimized QEP based on respective costs of executing each optimized QEP candidate;
   executing the optimized QEP to generate a query result that includes data stored within a database system using an efficiency of the optimized QEP being higher than an efficiency of the first QEP had the first QEP been executed, and an accuracy of the query result generated by the optimized QEP being lower than an accuracy of a query result that would have been generated based on the first QEP in accordance to the indicated precision loss is allowed; and
   providing the query result as output from the database system.

2. The method of claim 1, wherein determining that the syntax is provided comprises determining that a node of the first QEP includes a parameter that indicates that precision loss is allowed.

3. The method of claim 2, wherein the parameter is associated with the node by a parser that parses the first query to provide the first QEP.

4. The method of claim 2, wherein optimizing the first QEP comprises applying at least one rewriting of a set of rewritings to the node, the optimized QEP including the at least one rewriting, the at least one rewriting reducing an accuracy of the query result.

5. The method of claim 4, wherein the set of rewritings comprises round, floor, ceiling, and aggregation reordering.

6. The method of claim 1, further comprising:
receiving, by the query processing server, a second query, the second query being absent the syntax;
processing, by the query processing server, the second query to provide a second QEP, optimization of which would result in precision loss in a generated query result; and
determining that the syntax is absent from the second query, and in response, executing the second QEP to generate a second query result.

7. The method of claim 1, wherein the query processing server comprises a structured query language (SQL) server.

8. A non-transitory computer-readable storage medium coupled to one or more processors and having instructions stored thereon which, when executed by the one or more processors, cause the one or more processors to perform operations for processing queries to provide query results from database systems, the operations comprising:
receiving, by a query processing server, a first query, the first query comprising a syntax indicating that precision loss is allowed;
processing, by the query processing server, the first query to provide a first query execution plan (QEP);
in response to determining that the syntax indicating precision loss is allowed, associating, by a parser of the query processing server, a parameter with a node of the first QEP;
determining that the syntax is provided, and in response, optimizing the first QEP to provide an optimized QEP by:
generating a set of optimized QEP candidates based on the first EP using rewritings that would not have been included absent the parameter indicating that precision loss is allowed, and
selecting an optimized QEP candidate as the optimized QEP based on respective costs of executing each optimized QEP candidate;
executing the optimized QEP to generate a query result that includes data stored within a database system using an efficiency of the optimized QEP being higher than an efficiency of the first QEP had the first QEP been executed, and an accuracy of the query result generated by the optimized QEP being lower than an accuracy of a query result that would have been generated based on the first QEP in accordance to the indicated precision loss is allowed; and
providing the query result as output from the database system.

9. The computer-readable storage medium of claim 8, wherein determining that the syntax is provided comprises determining that a node of the first QEP includes a parameter that indicates that precision loss is allowed.

10. The computer-readable storage medium of claim 9, wherein the parameter is associated with the node by a parser that parses the first query to provide the first QEP.

11. The computer-readable storage medium of claim 9, wherein optimizing the first QEP comprises applying at least one rewriting of a set of rewritings to the node, the optimized QEP including the at least one rewriting, the at least one rewriting reducing an accuracy of the query result.

12. The computer-readable storage medium of claim 11, wherein the set of rewritings comprises round, floor, ceiling, and aggregation reordering.

13. The computer-readable storage medium of claim 8, wherein operations further comprise:
receiving, by the query processing server, a second query, the second query being absent the syntax;
processing, by the query processing server, the second query to provide a second QEP, optimization of which would result in precision loss in a generated query result; and
determining that the syntax is absent from the second query, and in response, executing the second QEP to generate a second query result.

14. The computer-readable storage medium of claim 8, wherein the query processing server comprises a structured query language (SQL) server.

15. A system, comprising: one or more computers; and a computer-readable storage device coupled to the computing device and having instructions stored thereon which, when executed by the computing device, cause the computing device to perform operations for processing queries to provide query results from database systems, the operations comprising:
receiving, by a query processing server, a first query, the first query comprising a syntax indicating that precision loss is allowed;
in response to determining that the syntax indicating precision loss is allowed, associating, by a parser of the query processing server, a parameter with a node of the first QEP;
processing, by the query processing server, the first query to provide a first query execution plan (QEP);
determining that the syntax is provided, and in response, optimizing the first QEP to provide an optimized QEP by:
generating a set of optimized QEP candidates based on the first QEP using rewritings that would not have been included absent the parameter indicating that precision loss is allowed, and
selecting an optimized QEP candidate as the optimized QEP based on respective costs of executing each optimized QEP candidate;
executing the optimized QEP to generate a query result that includes data stored within a database system using an efficiency of the optimized QEP being higher than an efficiency of the first QEP had the first QEP been executed, and an accuracy of the query result generated by the optimized QEP being lower than an accuracy of a query result that would have been generated based on the first QEP in accordance to the indicated precision loss is allowed; and
providing the query result as output from the database system.

16. The system of claim 15, wherein determining that the syntax is provided comprises determining that a node of the first QEP includes a parameter that indicates that precision loss is allowed.

17. The system of claim 16, wherein the parameter is associated with the node by a parser that parses the first query to provide the first QEP.

18. The system of claim 16, wherein optimizing the first QEP comprises applying at least one rewriting of a set of rewritings to the node, the optimized QEP including the at least one rewriting, the at least one rewriting reducing an accuracy of the query result.

19. The system of claim 18, wherein the set of rewritings comprises round, floor, ceiling, and aggregation reordering.

20. The system of claim 15, wherein operations further comprise:
receiving, by the query processing server, a second query, the second query being absent the syntax;

processing, by the query processing server, the second query to provide a second QEP, optimization of which would result in precision loss in a generated query result; and determining that the syntax is absent from the second query, and in response, executing the second QEP to generate a second query result.

\* \* \* \* \*